May 17, 1938.   R. B. SIMNING   2,117,577
VEHICLE AND MOUNTING MECHANISM THEREFOR
Filed Feb. 4, 1935   4 Sheets-Sheet 1
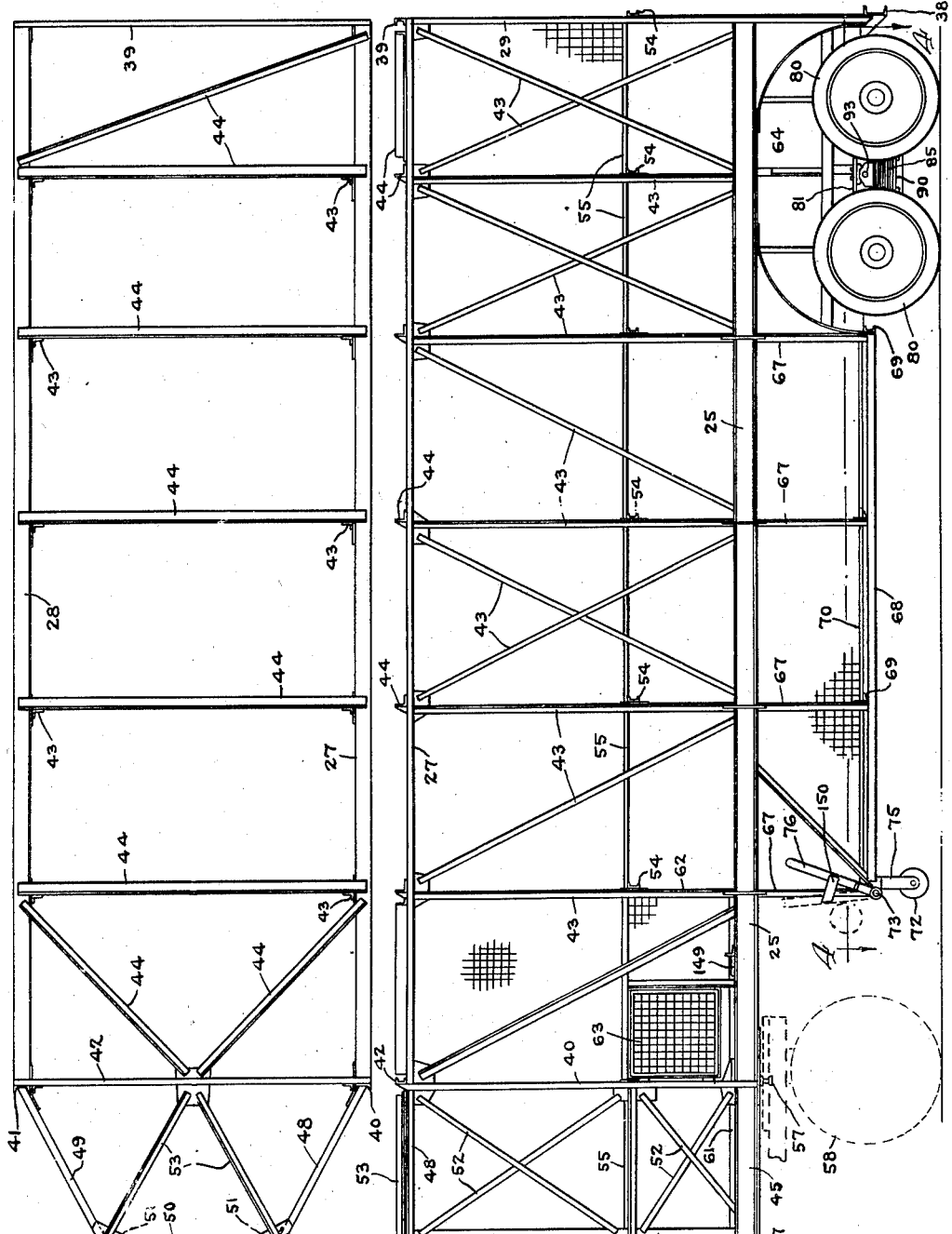
Inventor:
Roy B. Simning,
By G. H. Braddock
Attorney.

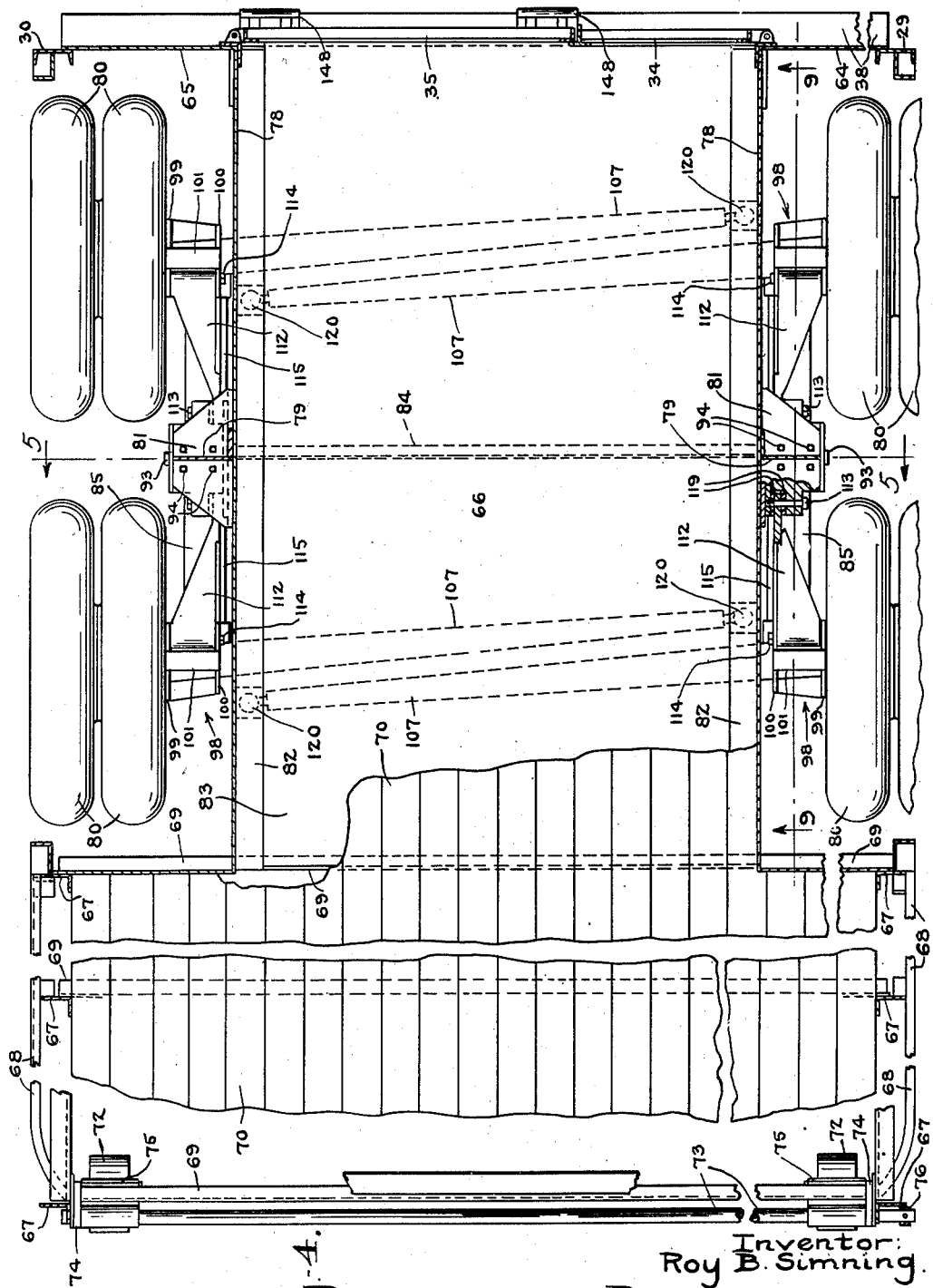

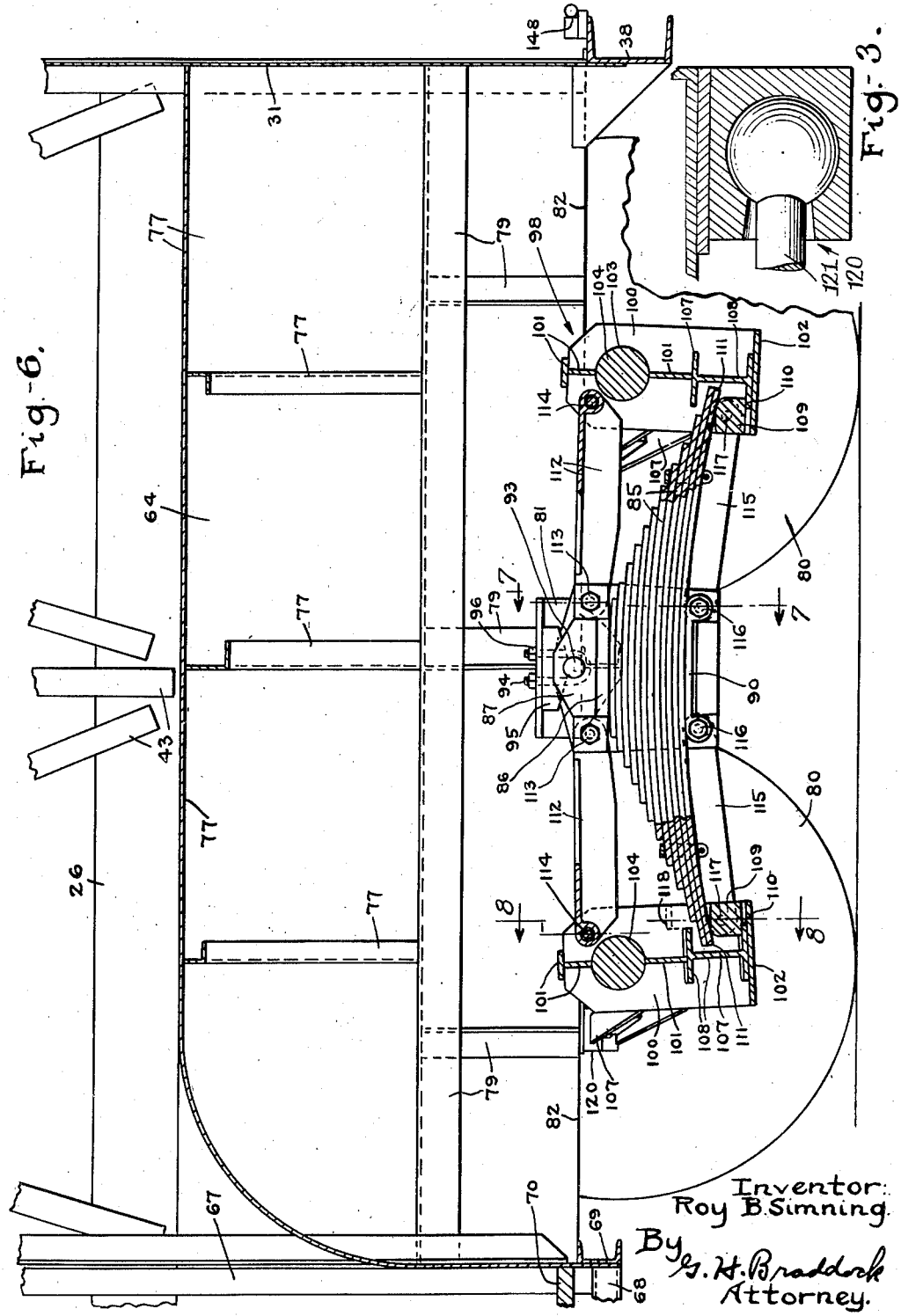

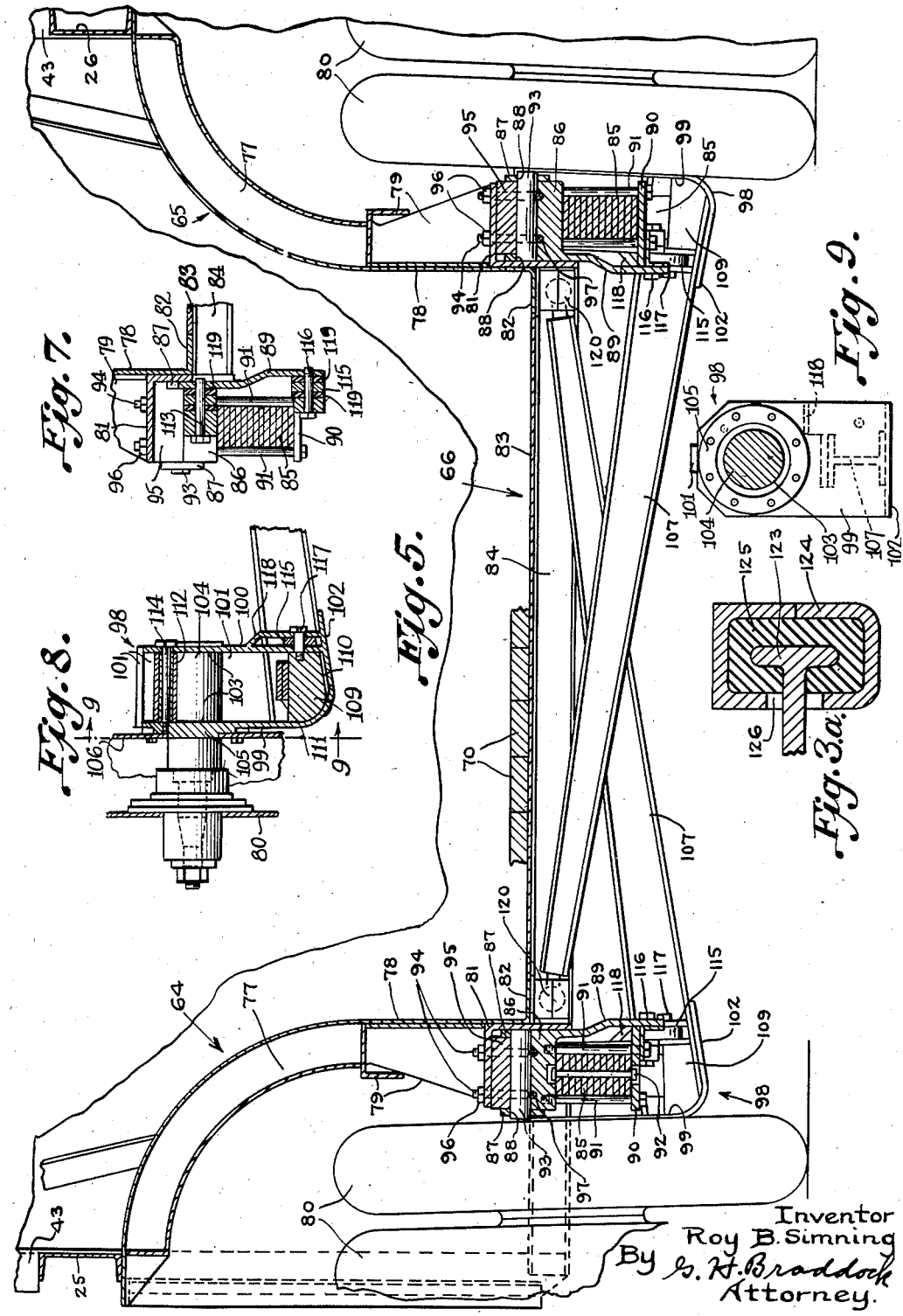

Patented May 17, 1938

2,117,577

UNITED STATES PATENT OFFICE 2,117,577

VEHICLE AND MOUNTING MECHANISM THEREFOR

Roy B. Simning, Minneapolis, Minn., assignor, by mesne assignments, to said Roy B. Simning, Harold J. Murphy, and George Verne Watson, all of Minneapolis, Minn.

Application February 4, 1935, Serial No. 4,911

15 Claims. (Cl. 296—106.5)

This invention relates to a vehicle and to mechanism for mounting said vehicle. Features of the invention may have relation to any type of vehicle, but specifically, in the present application, I have illustrated and shall describe the invention with reference to what is commonly known as a semi-trailer.

An object of the invention is to provide a vehicle, as, for example, a semi-trailer, which can be employed to transport material or articles of any nature, but which as disclosed is more especially adapted to transport live animals, such as cattle, horses, sheep, swine, etc., and in which vehicle will be incorporated various improved features and characteristics of construction novel both as individual entities of the vehicle and in combination, designed to render the vehicle an improvement generally over more or less similar structures heretofore known.

A further object is to provide mounting mechanism for a vehicle which will be of novel and improved construction.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming part of this specification,

Fig. 1 is a side elevational view of a vehicle and mounting mechanism therefor made according to the invention;

Fig. 2 is a plan view of the vehicle of Fig. 1;

Fig. 3 is a detail sectional view of a ball and socket joint on the frame of the vehicle for any of the anchor beams of the mounting mechanism for the vehicle;

Fig. 3a is a detail sectional view disclosing a modified arrangement for attaching each anchor beam to the frame of the vehicle;

Fig. 4 is a horizontal sectional view, taken on line 4—4 in Fig. 1, parts being broken away;

Fig. 5 is an enlarged, transverse sectional view, taken as on line 5—5 in Fig. 4;

Fig. 6 is an enlarged, longitudinal sectional view, taken as on line 6—6 in Fig. 4;

Fig. 7 is a transverse sectional view, taken as on line 7—7 in Fig. 6;

Fig. 8 is a transverse sectional view, taken as on line 8—8 in Fig. 6;

Fig. 9 is a detail sectional view, taken as on line 9—9 in Fig. 8.

With respect to the drawings and the numerals of reference thereon, the frame of the vehicle includes longitudinally extending, horizontally disposed main channel bars, denoted 25 and 26, respectively, one at either side of the frame and reaching from the rear of the vehicle to near the front thereof. The flanges of the main channel bars 25 and 26 project outwardly of the frame, or away from each other, and are at elevation just above the wheel housings of the vehicle.

Longitudinally extending, horizontally disposed channel bars, denoted 27 and 28 respectively, at the sides of the top of the frame, are above the main channel bars 25 and 26, and are of the same length as said main channel bars. The flanges of the channel bars 27 and 28 extend downwardly.

Vertical channel bars, denoted 29 and 30, respectively, at the rear corners of the vehicle, have their upper ends welded to the channel bars 27 and 28, respectively, and their lower portions welded to the main channel bars 25 and 26, respectively. Parts of said vertical channel bars 29 and 30 terminate below the elevation of the channel bars 25 and 26, say at about the elevation of the wheel centers.

Plate metal 31 extends transversely of the vehicle at the rear thereof, between the vertical channel bars 29 and 30, and is welded to said channel bars. A transversely extending, horizontally disposed channel bar 38 spans the distance between the channel bars 29 and 30 and is welded to the lower edge portion of the plate metal 31, and a transversely extending, horizontally disposed channel bar 39 has its opposite ends welded to the rearward ends of the channel bars 27 and 28.

Vertical channel bars, denoted 40 and 41, respectively, near the forward end of the vehicle, extend between the channel bars 25, 27 and 26, 28, respectively, and are welded thereto. A transversely extending, horizontally disposed channel bar 42 is arranged between the upper ends of the channel bars 40 and 41 and is welded to said last mentioned channel bars, as well as to the channel bars 27 and 28.

The lower ends of reinforcing bars, denoted 43, at either side of the frame are welded to the main channel bars 25 and 26, and the upper ends of said reinforcing bars 43 are welded to gussets which are themselves welded to the channel bars 27 and 28. Some of the bars 43 are vertical and some are oblique. Also, reinforcing bars, indicated 44, extend transversely of the top of the frame and are suitably welded to the channel bars 27 and 28, and to a web associated with the bar 42.

At the front of the frame, in advance of the channel bars 40, 41 and 42, are lower convergent bars 45, welded to the main channel bars 25 and 26, respectively, and a transverse connecting bar 47 between and welded to said bars 45. Above the bars 45, at the top of the frame, are upper convergent bars, indicated 48 and 49, respectively, welded to the bars 27 and 28, respectively, and a transverse connecting bar 50 between and welded to said bars 48 and 49.

Vertical bars 51 extend between the bars 45, 48 and 45, 49 and are welded thereto, and reinforcing bars 52, at each side of the frame, are welded to the bars 40, 41, 45, 48, 49, 51, or to gussets themselves welded to said bars. Reinforcing bars 53 at the top of the frame are welded to the bars 42, 48, 49 and 50, or to gussets welded to said bars.

Transverse channel bars 54 at the mid-height of the frame are welded to the opposite, vertical bars 29, 30 and 40, 41 and 43 and 51, to provide supports for a floor 55 furnishing an upper deck of the vehicle to which an entrance at the rear of the frame opens. Evidently, the upper deck extends the full width and length of the vehicle. The floor 55 is supported at locations between the transverse channel bars 54 by additional welded-in reinforcing members strengthening the floor and the frame.

A pair of transverse channel bars near the front of the vehicle are suitably welded to the main channel bars 25 and 26, and support a downwardly projecting king pin 57 for mounting the vehicle or semi-trailer upon the fifth wheel 58 of a truck or tractor (not shown). The king pin is desirably welded to the transverse channel bars and is at the midwidth of the frame.

A floor 61 at the front of the vehicle extends the full width of the frame.

A vertical separating member, or members, 62 extends transversely of the frame to define, together with the floors 55 and 61, and the front and side members of the frame, a relatively small deck adapted to receive small animals, such as calves, sheep, or pigs. The member, or members, 62 may be welded or otherwise attached into the structure in any suitable or preferred way. Numeral 63 represents a hinged door for the smaller deck arranged in a side member of the frame.

Wheel housings, denoted 64 and 65, respectively, for the vehicle or semi-trailer are at a rearward portion of the vehicle. Said wheel housings are specifically of a construction to be set forth. They extend inwardly and downwardly from the main channel bars 25 and 26, and are interconnected by a transverse structure, indicated generally at 66 and presently to be described, at the elevation of lower portions of the vertical channel bars 29 and 30, somewhat below the main channel bars 25 and 26.

Vertical angle bars 67, at either side of the frame, are welded to the main channel bars 25 and 26 and extend downwardly therefrom at location between the wheel housings 64, 65 and the king pin 57. The lower ends of the angle bars 67 suitably support longitudinally extending channel bars 68 and transversely extending bars 69, said bars 68 and 69 being welded directly or indirectly to said angle bars 67. The bars 68 and 69 are at the elevation of the structure 66, and all of the elements 66, 68 and 69 provide a support for a floor 70 of a lower deck of the vehicle, which lower deck is defined at its top and bottom by the floors 55 and 70, at its front by the member or members 62 and the forward angle bars 67, at its rear by the rear of the frame, and at its sides by the sides of said frame and the inner surfaces of the wheel housings 64 and 65.

The frame and the partition between the lower and the smaller decks, as well as the doors, are covered by screen and/or fence. The upper and lower decks, constructed as illustrated and described, are for transporting larger animals, such as horses and cattle. The animals stand crosswise of the decks while being conveyed. The distance between the wheel housings 64 and 65 is sufficient to accommodate the lower portions, or front and rear legs, of animals arranged crosswise of the vehicle, while the upper portions of the animals project over the upper curved parts of the wheel housings, so that no portion of the lower deck is waste space, as will be understood.

While I have illustrated and described a specific structure of frame, including welded together members providing three decks for animals, it is to be understood that in some cases the frame could be fabricated in manners considerably different from the disclosure as made. Explicitly, however, there are some features of the frame of the vehicle having novel and improved relation to the supporting mechanism for the vehicle and to the propulsion thereof, as will be set forth.

Small front wheels for the vehicle or semi-trailer are denoted 72. These wheels support the vehicle or semi-trailer when it is removed from the truck or tractor. The small wheels 72 are pivotally supported by means of a transverse shaft 73 mounted in bearings 74 at the forward ends of the longitudinal bars 68. When the forward portion of the vehicle or semi-trailer is supported upon the ground, the wheel brackets 75 are beneath the lower front portion of the lower deck, and when the vehicle or semi-trailer is associated with the truck or tractor and in use, the wheel brackets and small wheels are moved to position against the lower part of the front of the lower deck. A lever 76 fixed to the shaft 73 is for manipulating the wheel brackets and small wheels. Association of a semi-trailer of the present general character with a truck or tractor, by means of a king pin such as 57, causes the forward portion of the semi-trailer to be elevated. Thus, the small wheels 72 are freed from the ground to be easily swung upwardly and fastened by means of the locking plate 150 when the vehicle or semi-trailer of the invention is associated with a truck or tractor.

Each wheel housing 64, 65 includes a strong, solid, curved bracket, or brackets, 77 welded to a main channel bar 25 or 26, as the case may be, and extending downwardly and inwardly as before explained. Each curved bracket, or brackets, 77 is integral with, or rigidly supports, a vertical plate 78 extending longitudinally of and rigid with the frame, said plates 78 desirably being reinforced as at 79. Each plate 78 in turn supports the mechanism for mounting a set of rear wheels, denoted 80, at each side of the vehicle or frame. In the instance of the mounting mechanism for each set of rear wheels, 81 represents an L-shaped bracket having its vertical arm welded to an outer surface of a plate 78 and its horizontal arm extending outwardly. The L-shape brackets 81 may desirably be at the longitudinal centers of the plates 78.

The lower portion of each vertical plate 78 extends inwardly horizontally, as at 82, and a horizontal plate 83 is suitably welded into the frame between the portions 82. A transverse reinforcing member 84 is welded into the frame between the extensions 82 and the vertical arms of the L-shape brackets 81 at the opposite sides of the frame just beneath the plate 83. Said plate 83 and transverse reinforcing member 84 are also desirably welded to each other and constitute, together with the portions 82, the structure 66 hereinbefore mentioned.

A bracket member for each set of rear wheels rigidly supports the midlength portion of a set of leaf springs 85 and in turn said bracket member is pivotally supported upon the corresponding L-shape bracket 81 for vertical swinging movement. The leaf springs 85 extend longitudinally of the vehicle. Each bracket member consists of a body portion 86 having upstanding, spaced apart ears 87 with alining openings 88, and downwardly extending portion 89 suitably carrying a spring seat 90. Each set of leaf springs lies between a body portion 86 and a spring seat 90, and four screw bolts 91 at the outer sides of the leaf springs extend through the spring seat 90 and enter the body portion 86 to fasten and clamp the leaf springs in the bracket member. The usual rod 92 extends through the leaf springs and enters the upper and lower supports to stabilize said leaf springs. Each bracket member is pivotally supported upon the horizontal arm of the corresponding L-shape bracket 81 by a horizontal stud 93, arranged transversely of the frame, in the openings 88 and surrounded by U-bolts 94 which pass upwardly through a block 95 and said horizontal arm of the corresponding bracket member. Nuts 96 upon the U-bolts 94 clamp the block 95 against the horizontal arm of the bracket member and draw the stud 93 up against said block 95. The lower surface of each block 95 is of curvilinear conformation to nicely seat the corresponding stud 93, and each body portion 86 is slotted, as at 97, to accommodate the U-bolts and allow free rotative movement of the bracket member, as will be understood.

Wheel carrying members 98 are associated with the opposite end portions of each set of leaf springs 85. Each wheel carrying member 98 includes parallel plates 99 and 100 held in spaced relation by reinforcing members 101 welded to the plates. The plate 99 includes an extension portion 102 at its bottom which extends beneath the lower end of the plate 100. Alined openings 103 in the plates 99 and 100 of each wheel carrying member 98 support a shaft 104 for a wheel 80. The wheels 80 and the brakes and brake drums are mounted upon or about the shafts 104 in any convenient manner. In Figs. 8 and 9, numeral 105 indicates a disc plate attached to the plate 99 about the shaft 104 for securing a brake mechanism 106 in position. The shafts 104 are welded to the wheel carrying members 98, and the wheels 80 are freely rotatable upon said shafts.

Anchor beams, one for each wheel carrying member 98, are represented at 107. As disclosed, each anchor beam 107 is an I-beam or member having one of its end portions inserted through an opening 108 in the plate 100 of a wheel carrying member 98 to engage the plate 99, and so that the base of the inserted end portion engages the extension 102. The inserted portion of each anchor beam is welded to the corresponding wheel carrying member. A spring pad 109, one for each anchor beam 107, is welded or otherwise secured to the base of the inserted portion of the anchor beam, as at 110, to be supported thereby, and the adjacent end portion 111 of a set of leaf springs 85 at the corresponding side of the vehicle rides upon said spring pad, the ends of the leaf springs terminating at location between the spring pads and the upper flanges of the anchor beams, as will be quite clear from Fig. 6.

Each bracket member for each set of rear wheels pivotally supports a pair of upper and a pair of lower radius rods, which radius rods are also pivotally attached to the corresponding forward and rearward wheel carrying members 98. In the instance of each upper radius rod 112, an end portion of the radius rod is pivoted, as at 113, between ears upon the body portion 86, and the opposite end portion of the radius rod is pivoted, as at 114, between the plates 99 and 100. In the instance of each lower radius rod 115, an end portion of the radius rod is pivoted, as at 116, between ears upon the downwardly extending portion 89, and the opposite end portion of the radius rod is pivoted, as at 117, between the plate 100 and a smaller plate 118 adjacent said plate 100 and held thereto. The pivotal supports 113 and 116 include rubber washers 119 at either side of each radius rod and between the ears to allow slight sidewise resilient swinging movement of the radius rods, for an obvious purpose.

The end of each anchor beam 107 which is spaced from the wheel carrying member 98 to which the anchor beam is secured, is mounted for universal swinging movement in a bearing 120 rigidly supported by the frame at the side thereof opposite said mentioned wheel carrying member, there being one bearing 120 for each anchor beam. As disclosed in Fig. 3, the mounting for each anchor beam 107 is constituted by a ball and socket joint, the ball 121 of the joint being rigid with the anchor beam, and the socket 122 being suitably supported by the horizontal extension 82 and a reinforcement of said extension, the upper part of the socket being welded to the extension.

In Fig. 3a I have disclosed a modified type of bearing for the anchor beams. As here disclosed, the member 123 integral with the anchor beam 107 is a T, and the member 124 to be attached to the frame of the vehicle is of box-like conformation, numeral 125 indicating rubber inserted or padded into the member 124 about the member 123, and 126 denoting an opening in said member 124 to permit swinging movement of the anchor beam.

It will be apparent that the rear wheels 80 of the vehicle support the frame through the instrumentality of the leaf springs 85 at the opposite sides of the vehicle, said leaf springs resting upon the spring pads 109 and being grasped at their midlengths and securely held by the brackets pivotally supported by the studs 93 upon the L-shape brackets 81 rigid with members of the frame which are in turn rigid with the main channel bars or girders 25 and 26 extending longitudinally of the vehicle. Or, stated differently, the wheel housings are rigid with the main longitudinal girders of the frame, and the axes for the leaf springs are rigid with said wheel housings. Thus, the weight of the frame is carried to the rear wheels of the vehicle through supporting springs rigidly, but oscillatably, attached to said frame. It should be noted that in some instances the elements 85 need not be leaf springs, or even springs, but could be non-resilient members, having their opposite ends resting upon pads such as 109.

As a forward wheel 80 is caused to change its elevation as it travels over the ground, a rearward wheel 80 at this same side of the vehicle moves in opposite direction, upwardly or downwardly, as the case may be, the whole wheel mounting oscillating on the stud 93. As the wheels move upwardly and downwardly when running over the ground, to flex the end portions of the leaf springs, the radius rods 112 and 115 swing upwardly and downwardly upon their pivots, as will be evident.

In some instances, anchor beams such as 107 may not be employed, provision being otherwise made for assuring that the wheel carrying members stay assembled with the end portions of the leaf springs. When anchor beams as illustrated and described are employed, they render a very advantageous service, in addition to assuring permanent assembly of the wheel carrying members with the leaf springs.

It will be obvious that when a rear wheel 80 bobs up and down under the frame, due to flexing of the leaf spring carrying said wheel, the corresponding anchor beam oscillates in its bearing 120 at the opposite side of the frame. However, as the different sides of the frame have tendency to bob up and down, to thus have tendency to alter the elevations of the brackets supporting the opposite leaf springs, the anchor beams perform a load stabilizing service not at once apparent from a glance at the disclosure as made. That is to say, the anchor beams 107 of the invention are load stabilizing members adapted to reduce sidewise pitching or rocking or jolting movement of the vehicle frame to a minimum. More specifically, suppose one side of the frame of the vehicle to be moved downwardly, due to a vertical thrust at this side, to an extent greater than the opposite side of said frame. This vertical thrust will be imparted as well to the wheels at the corresponding side of the frame and to the ends of the anchor beams rigid with the wheel carrying members, through the instrumentality of the leaf springs at this same side of the frame, as will be obvious. The downward vertical movement of one side of said frame will cause the wheel carrying members and the anchor beams rigid therewith to move downwardly as an integral unit, and this downward movement will be imparted to the opposite side of the frame through the instrumentality of said anchor beams, the downward force being applied at the bearings 120, which cannot under such condition allow pivotal movement of the anchor beams because said anchor beams and their pivoted ends are actually moved downwardly and not swung relatively to the frame as when the wheels bob up and down under the frame. Or, stated differently, any downward movement at a side of the frame of the vehicle sufficient to move the end of an anchor beam attached at this same side of the frame downwardly with the frame more or less as a unit, will cause resultant downward movement of the opposite side of the frame, through the anchor beam which was moved downwardly, and thus reduce sidewise rocking or jolting movement of the vehicle or semi-trailer to a minimum. At the same time, ordinary bobbing of the rear wheels of the vehicle allowing it to continue its course at an approximately even keel or level elevation, is cared for by the leaf springs and the greatly improved wheel mounting mechanism as illustrated and described, allowing easy pivotal movement of the anchor beams in response to the bobbing of the wheels or to oscillation of the wheel supports upon the studs 93 as uneven ground is passed over.

After tendency toward a jolting movement at a side of the frame, a natural rebound occurs to cause this side of the frame to be elevated. Obviously, the wheel supports at this same side of the frame have this rebound movement imparted to them, and through the anchor beams rigidly attached to said wheel supports the upward reaction is imparted to the opposite side of the frame, in the same general manner as already set forth. Thus, upon tendency toward either upward or downward movement of one side only of the frame of the vehicle; or tendency of either side toward movement to above or below an approximately level and natural elevation of said frame; there is reaction through the anchor beams rigid with the wheel supports at one side of the frame and pivoted to the opposite side of said frame to cause said opposite side to move in a like direction tending always to keep the vehicle on an even keel, rocking toward neither right nor left. In actual practice and when transporting liquid upon wheel supporting mechanisms incorporating the principles as illustrated and described, there is but little tendency toward causing the liquid to splash over due to any sidewise rocking or tilting of the vehicle.

It will be evident that when the vehicle is under no load, the wheels 80 will be at a slightly different angle than when said vehicle is under load. The arrangement is such that when the vehicle is out of use, the rear wheels slant slightly to the vertical, downwardly and inwardly, due to the fact that the frame and hence the pivoted ends of the anchor beams are at their highest elevation when there is no load. When a load is applied, the frame carries the weight against the leaf springs and moves downwardly slightly. This moves the pivoted ends of the anchor beams downwardly to correspond, and, through the instrumentality of the anchor beams and the wheel supports, swings the wheels to vertical position, as will be understood.

Attention is called to the fact that in some cases the wheel supporting structure may include mechanism for carrying but a single rear wheel at either side of the vehicle. In such case, the brackets for the leaf springs 85 would be made rigid with the frame and not oscillatable thereon, and but one end of each leaf spring would be employed to support a wheel carrying member in some instances perhaps attached to an anchor beam such as 107, and in some instances perhaps having no anchor beam.

Referring more particularly to Fig. 1, attention is called to the fact that the propulsion or draft of the vehicle or semi-trailer is along a longitudinal way extending, generally, upwardly from the rear wheel axles through the wheel housings to the main channel bars or girders 25 and 26, and thence along said bars or girders to the king pin 57, so that the advancing or propelling action upon the rear wheels is in a general downward direction assuring the maximum in traction. That is, the king pin 57 is at elevation above the rear wheel axles, and the draft is longitudinally rearwardly through the frame, particularly along the main girders 25 and 26, thence downwardly through rigid members to the studs 93, and thence to the wheel axles.

What is claimed is:

1. The combination with a vehicle frame, of wheel supporting mechanism for said frame including a bracket member mounted at a side of the frame for swinging movement in a vertical plane extending longitudinally of said vehicle, a leaf spring having its intermediate portion rigid with said bracket member, wheel carrying members, one at the rear and one at the front of said bracket member, upon which the opposite end portions of said leaf spring rest, an anchor member integral with each wheel carrying member and extending transversely of the vehicle, and means pivotally attaching the anchor members to the opposite side of said frame.

2. The combination with a vehicle frame, of a wheel supporting mechanism at each side of said frame, each of said wheel supporting mechanisms including a bracket member mounted upon a shaft rigid with the frame for swinging movement in a vertical plane extending longitudinally of said vehicle, an element rigid with said bracket member, wheel carrying members, one at the rear and one at the front of said bracket member, supporting spaced apart portions of said element, an anchor member integral with each wheel carrying member and extending transversely of the vehicle, and means pivotally attaching each anchor member to the opposite side of said frame.

3. The combination with a vehicle frame including longitudinally extending girder members and rigid members rigid with said girder members extending downwardly and inwardly of said frame, of a wheel supporting mechanism at each side of said frame, each of said wheel supporting mechanisms including a bracket member mounted upon a shaft rigid with one of said rigid members for swinging movement in a vertical plane extending longitudinally of said vehicle, a spring member rigid with said bracket member, wheel carrying members, one at the rear and one at the front of said bracket member, supporting spaced apart portions of said spring member, an anchor member integral with each wheel carrying member and extending transversely of the vehicle, and means pivotally attaching each anchor member to the opposite side of said frame.

4. The combination with a vehicle frame including longitudinally extending girder members and wheel housings rigid with said girder members extending downwardly and inwardly of said frame, of a wheel supporting mechanism at each side of said frame, each of said wheel supporting mechanisms including a bracket member mounted upon a shaft rigid with one of said wheel housings for swinging movement in a vertical plane extending longitudinally of said vehicle, a leaf spring having its intermediate portion rigidly fastened in said bracket member, wheel carrying members, one at the rear and one at the front of said bracket member, supporting the opposite end portions of said leaf spring, an anchor member integral with each wheel carrying member and extending transversely of the vehicle, and means universally attaching each anchor member to the opposite side of said frame.

5. The combination with a vehicle frame, of a wheel supporting mechanism at each side of said frame, each of said wheel supporting mechanisms including a bracket member mounted upon a shaft rigid with the frame for swinging movement in a vertical plane extending longitudinally of said vehicle, an element rigid with said bracket member, wheel carrying members, one at the rear and one at the front of said bracket member, supporting spaced apart portions of said element, radius rods between said bracket member and said wheel carrying members and pivotally attached to the bracket member and wheel carrying members, an anchor member integral with each wheel carrying member and extending transversely of the vehicle, and means pivotally attaching each anchor member to the opposite side of said frame.

6. The combination with a vehicle frame, of a wheel supporting mechanism at each side of said vehicle frame, each of said wheel supporting mechanisms including a bracket member mounted upon a shaft rigid with the frame for swinging movement in a vertical plane extending longitudinally of said vehicle, an element rigid with said bracket member, wheel carrying members, one at the rear and one at the front of said bracket member, supporting spaced apart portions of said element, a stabilizer for said vehicle frame integral with each wheel carrying member and extending transversely of the vehicle, and means pivotally attaching each stabilizer to the opposite side of said frame.

7. The combination with a vehicle frame including downwardly and inwardly extending wheel housings and a reinforcing member between lower portions of said wheel housings and extending across the frame, of a wheel supporting mechanism for said frame at each side thereof, each of said wheel supporting mechanisms including a spring member attached to the frame, a wheel carrying member engaged beneath an end portion of said spring member to support the same, an anchor member integral with said wheel carrying member and extending transversely of the frame beneath said reinforcing member, and means pivotally attaching an end portion of said anchor member to an opposite location of said frame.

8. The combination with a vehicle frame including longitudinally extending girder members, rigid members rigidly attached to said girder members and extending downwardly and inwardly therefrom, and a reinforcing member between lower portions of said downwardly and inwardly extending members and extending across said frame, of a wheel supporting mechanism attached to each of said downwardly and inwardly extending members, each wheel supporting mechanism including a wheel carrying member engaged beneath a spring member to support the same, an anchor member rigid with said wheel carrying member and extending transversely of the frame beneath said reinforcing member, and means pivotally attaching an end portion of said anchor member to an opposite location of said frame.

9. The combination with a vehicle frame including downwardly and inwardly extending members and a reinforcing member between lower portions of said downwardly and inwardly extending members, of wheel supporting mechanism for said frame including an element attached to each side of the frame, a wheel carrying member engaged beneath each element to support the same, a stabilizer for the vehicle frame rigid with each wheel carrying member and extending transversely of said frame beneath said reinforcing member, and means pivotally attaching each stabilizer to an opposite location of the frame.

10. The combination with a vehicle frame including downwardly and inwardly extending wheel housings at the opposite sides of said frame and a reinforcing member between lower portions of said wheel housings and extending across the frame, said downwardly and inwardly extending wheel housings and said reinforcing member defining a receiving space of said vehicle, of a wheel supporting mechanism at each side of said frame and attached thereto, the wheel supporting mechanisms being at the outer sides of the wheel housings and below the opposite side portions of said receiving space.

11. The combination with a vehicle frame including longitudinally extending girder members, rigid members rigid with said girder members and extending downwardly and inwardly therefrom, and a reinforcing member between lower portions of said downwardly and inwardly extending members and extending across the frame, said downwardly and inwardly extending members and said reinforcing member defining a receiving space of said vehicle, of a wheel supporting mechanism at each side of said frame and attached thereto, the wheel supporting mechanisms being at the outer sides of the downwardly and inwardly extending members and below the opposite side portions of said receiving space.

12. A vehicle frame comprising longitudinally extending girder members, rigid members rigid with said girder members and extending downwardly and inwardly therefrom, and a reinforcing member between lower portions of said downwardly and inwardly extending members, said downwardly and inwardly extending members comprising means for carrying wheels for said frame, and said downwardly and inwardly extending members and said reinforcing member defining a receiving and carrying space of said vehicle.

13. A vehicle frame comprising longitudinally extending girder members, rigid members rigid with said girder members and extending downwardly and inwardly at opposite sides of said frame, and a reinforcing member extending horizontally between lower portions of said downwardly and inwardly extending members and rigidly connecting them to each other, said downwardly and inwardly extending members comprising means for carrying wheels for said frame, and said girder members, downwardly and inwardly extending members and reinforcing member together defining a receiving and carrying space of said vehicle.

14. The combination with a vehicle frame, of a wheel supporting mechanism at each side of said frame, each of said wheel supporting mechanisms including a bracket member mounted upon a shaft rigid with the frame for swinging movement in a vertical plane extending longitudinally of said vehicle, an element rigid with said bracket member, wheel carrying members, one at the rear and one at the front of said bracket member, supporting spaced apart portions of said element, an anchor member rigid with each wheel carrying member and extending transversely of the vehicle, and means pivotally attaching each anchor member to said frame at location in spaced relation to the wheel carrying member with which the anchor member is rigid.

15. The combination with a vehicle frame including downwardly and inwardly extending wheel housings and a reinforcing member between lower portions of said wheel housings and extending across the frame, of a wheel supporting mechanism for said frame at each side thereof, each of said wheel supporting mechanisms including a spring member attached to the frame, a wheel carrying member engaged beneath a portion of said spring member to support the same, an anchor member rigid with said wheel carrying member and extending transversely of the frame beneath said reinforcing member, and means pivotally attaching said anchor member to said frame at location in spaced relation to said wheel carrying member.

ROY B. SIMNING.